(12) United States Patent
Kreinbrink et al.

(10) Patent No.: US 10,819,260 B2
(45) Date of Patent: Oct. 27, 2020

(54) FREQUENCY AND LOAD BALANCE COMPENSATED, GATE FIRING PHASE SHIFT DELAY LINE

(71) Applicant: Rockwell Automation Technologies, Inc., Mayfield Heights, OH (US)

(72) Inventors: Joseph V. Kreinbrink, Euclid, OH (US); James Huang, Cleveland, OH (US); Joseph S. Klak, Concord Township, OH (US); Mark S. Ruetty, Mayfield Heights, OH (US)

(73) Assignee: ROCKWELL AUTOMATION TECHNOLOGIES, INC, Mayfield Heights, OH (US)

( * ) Notice: Subject to any disclaimer, the term of this patent is extended or adjusted under 35 U.S.C. 154(b) by 69 days.

(21) Appl. No.: 16/213,966

(22) Filed: Dec. 7, 2018

(65) Prior Publication Data

US 2020/0186066 A1    Jun. 11, 2020

(51) Int. Cl.
| | | |
|---|---|---|
| *H02M 1/08* | (2006.01) | |
| *H02P 7/293* | (2016.01) | |
| *H02M 7/217* | (2006.01) | |
| *H02P 7/29* | (2016.01) | |

(52) U.S. Cl.
CPC .............. *H02P 7/293* (2016.02); *H02M 1/08* (2013.01); *H02M 7/217* (2013.01); *H02P 7/29* (2013.01)

(58) Field of Classification Search
CPC . H02P 7/293; H02P 7/29; H02M 1/08; H02M 7/217
See application file for complete search history.

(56) References Cited

U.S. PATENT DOCUMENTS

| | | | |
|---|---|---|---|
| 3,605,026 A | 9/1971 | Bowden | |
| 4,429,357 A | 1/1984 | Hausler et al. | |
| 4,459,652 A | 7/1984 | James et al. | |
| 4,565,953 A | 1/1986 | Espelage et al. | |
| 4,639,851 A | 1/1987 | Johnson | |
| 4,864,487 A | 9/1989 | Schnetzka, II et al. | |
| 5,050,058 A | 9/1991 | April et al. | |
| 5,416,374 A * | 5/1995 | Inoue .................... | H02N 2/142 310/316.02 |

(Continued)

FOREIGN PATENT DOCUMENTS

| | | |
|---|---|---|
| EP | 0620635 A1 | 10/1994 |
| JP | S62107680 A | 5/1987 |

OTHER PUBLICATIONS

European Application No. 19213782.6, Extended European Search Report, dated May 6, 2020, pp. 1-10.

(Continued)

*Primary Examiner* — Muhammad S Islam
(74) *Attorney, Agent, or Firm* — Kunzler Bean & Adamson; Bruce R. Needham

(57) ABSTRACT

An apparatus for an alpha trim adjustment includes a phase delay circuit that creates a phase delay for a gate signal for a switching cycle. The gate signal is for a phase of a three-phase, phase shifted alternating current ("AC") input of a multi-pulse motor drive powering a direct current ("DC") motor. The apparatus includes an alpha trim circuit that modifies the phase delay with an alpha trim adjustment to create an adjusted phase delay for the switching cycle, a delay application circuit that applies the adjusted phase delay to the gate signal.

19 Claims, 5 Drawing Sheets

(56) References Cited

U.S. PATENT DOCUMENTS

| | | |
|---|---|---|
| 5,650,739 A | 7/1997 | Hui et al. |
| 5,923,550 A | 7/1999 | Kumar |
| 6,204,710 B1 | 3/2001 | Goetting et al. |
| 6,594,164 B2 | 7/2003 | Suzuki |
| 6,661,862 B1 | 12/2003 | Butcher |
| 6,788,124 B1 | 9/2004 | Kaviani |
| 6,847,246 B1 | 1/2005 | Kaviani et al. |
| 7,034,501 B1 | 4/2006 | Thunes et al. |
| 7,148,661 B2 | 12/2006 | Trainer et al. |
| 7,352,836 B1 | 4/2008 | Mendenhall |
| 7,453,301 B1 | 11/2008 | Kaviani |
| 7,564,283 B1 | 7/2009 | Logue et al. |
| 7,716,001 B2 | 5/2010 | Lee et al. |
| 7,893,739 B1 | 2/2011 | Nagarajan et al. |
| 8,264,860 B2 | 9/2012 | Green |
| 8,344,706 B2 | 1/2013 | Green |
| 8,472,153 B1 | 6/2013 | Grbovic |
| 8,476,873 B2 | 7/2013 | Green |
| 8,682,455 B2 | 3/2014 | Yang et al. |
| 9,019,734 B2 | 4/2015 | Kreinbrink |
| 9,032,238 B2 | 5/2015 | Kreinbrink et al. |
| 9,667,157 B1 | 5/2017 | Dong et al. |
| 2007/0080728 A1 | 4/2007 | Iwata |
| 2007/0138990 A1 | 6/2007 | Lewis et al. |
| 2008/0168293 A1 | 7/2008 | Allen et al. |
| 2008/0303501 A1* | 12/2008 | Prodic .................. H02M 3/157 323/283 |
| 2009/0033266 A1* | 2/2009 | Kreinbrink .............. H02P 6/15 318/440 |
| 2013/0002330 A1 | 1/2013 | Kreinbrink et al. |
| 2013/0200937 A1 | 8/2013 | Patil et al. |
| 2018/0274122 A1* | 9/2018 | Guskov .................. C25D 17/02 |

OTHER PUBLICATIONS

Se-Jong Jeong, et al., "Current Control of 12-pulse Regenerative Converter for 20kA Magnetic Power Supply", Div. of Electronics and Information, Chonbuk National University, pp. 256-260.

\* cited by examiner

FREQUENCY AND LOAD BALANCE COMPENSATED, GATE FIRING PHASE SHIFT DELAY LINE

BACKGROUND INFORMATION

The subject matter disclosed herein relates to motor controllers and more specifically applies to multi-pulse motor controllers for direct current ("DC") motors.

BRIEF DESCRIPTION

An apparatus with an alpha trim adjustment includes a phase delay circuit that creates a phase delay for a gate signal for a switching cycle. The gate signal is for a switch of a phase of a three-phase, phase shifted alternating current ("AC") input of a multi-pulse motor drive powering a direct current ("DC") motor. The apparatus includes an alpha trim circuit that modifies the phase delay with an alpha trim adjustment to create an adjusted phase delay for the switching cycle, a delay application circuit that applies the adjusted phase delay to the gate signal.

Another apparatus with an alpha trim adjustment includes a first delay circuit that delays a gate signal by 30 degrees plus a first alpha trim adjustment for a first switching cycle. The gate signal is for a phase of a three-phase, phase shifted AC input of a multi-pulse motor drive powering a DC motor. The apparatus includes a second delay circuit that delays the gate signal by 30 degrees plus a second alpha trim adjustment for another switching cycle and a setup switch that changes between a first position that connects the first delay circuit while disconnected from the second delay circuit and a second position that connects the second delay circuit while disconnected from the first delay circuit. The apparatus includes a setup switch controller that changes the setup switch between the first position and the second position during a non-switching period between switching cycles. The apparatus includes an average current circuit that measures current from two or more phases feeding a 0-degree rectifier of the multi-pulse motor drive and that measures current from two or more phases feeding a 30-degree rectifier of the multi-pulse motor drive and that averages the currents from the phases of feeding the 0-degree rectifier and averages the currents from the phases feeding the 30-degree rectifier. The apparatus includes an alpha trim circuit that adjusts the second alpha trim adjustment while the setup switch is in the first position and that sets the first alpha trim adjustment while the setup switch is in the second position in response to an amplitude difference between the average current from the 0-degree rectifier and the average current from the 30-degree rectifier.

A multi-pulse motor controller with an alpha trim adjustment includes a 0-degree rectifier with a plurality of drive switches each driven by a gate signal. The 0-degree rectifier is fed by non-phase-shifted phases of a power source. The multi-pulse motor controller includes a 30-degree rectifier includes a plurality of drive switches each driven by a gate signal, the 30-degree rectifier fed by phase-shifted phases of a power source. Outputs of the 0-degree rectifier and the 30-degree rectifier feed a DC motor. Each drive switch of the 30-degree rectifier includes a first delay circuit that delays a gate signal by 30 degrees plus a first alpha trim adjustment for a first switching cycle, a second delay circuit that delays the gate signal by 30 degrees plus a second alpha trim adjustment for another switching cycle, and a setup switch that changes between a first position that connects the first delay circuit while disconnecting the second delay circuit and a second position that connects the second delay circuit while disconnecting the first delay circuit. The multi-pulse motor drive includes a setup switch controller that changes the setup switch of a drive switch between the first position and the second position during a non-switching period between switching cycles of the drive switch, and an alpha trim circuit that, for each drive switch, adjusts the second alpha trim adjustment while the setup switch of the drive switch is in the first position and that sets the first alpha trim adjustment while the setup switch for the drive switch is in the second position.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
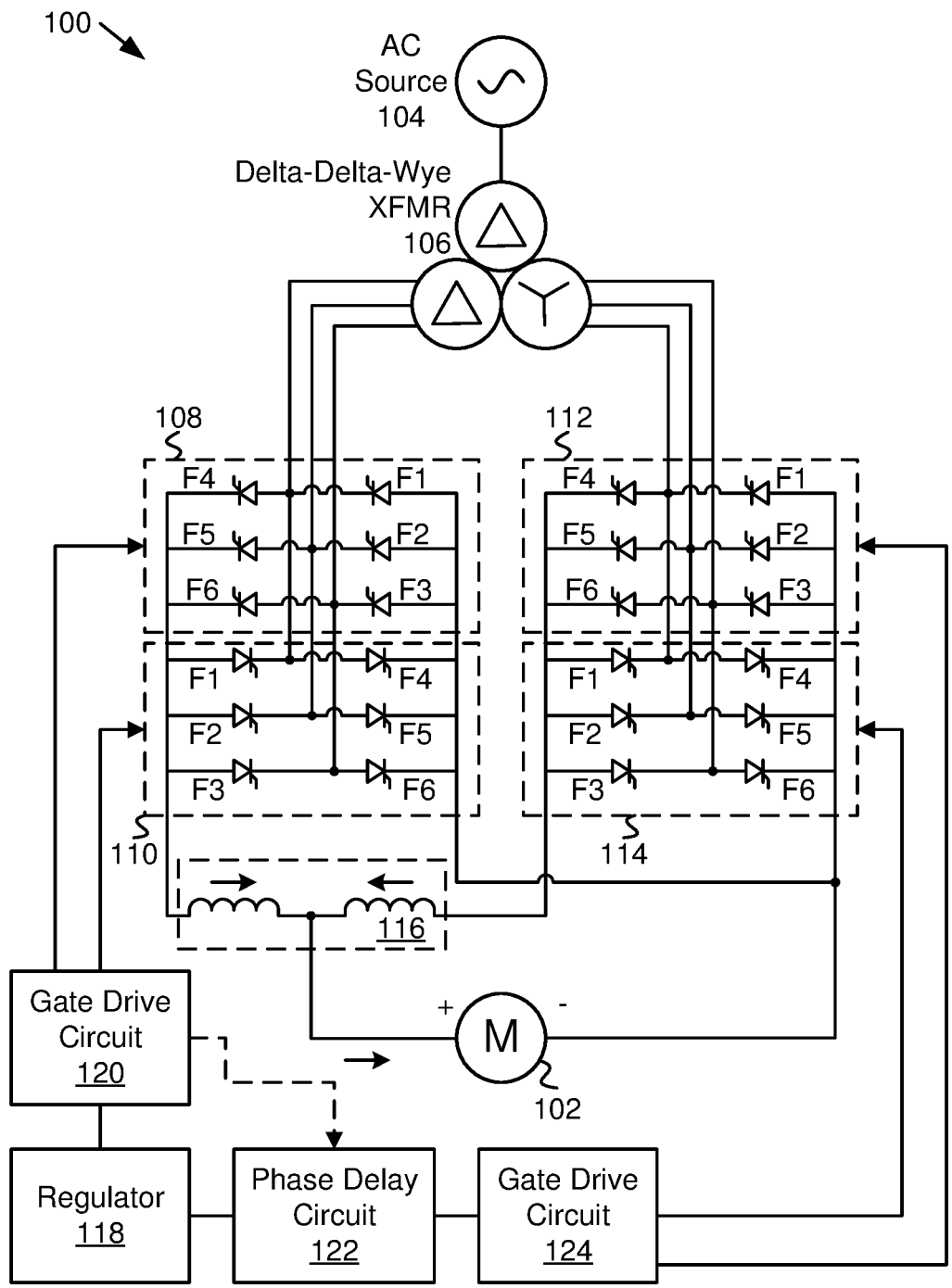
FIG. 1 is a schematic block diagram of one embodiment of a 12-pulse motor drive powering a direct current ("DC") motor and one embodiment of control circuits.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as circuits, in order to more particularly emphasize their implementation independence. For example, a circuit may be implemented as a hardware circuit comprising custom VLSI circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

Circuits may also be implemented partially in software for execution by various types of processors. An identified with a software module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory ("RAM"), a read-only memory ("ROM"), an erasable programmable read-only memory ("EPROM" or Flash memory), a portable compact disc read-only memory ("CD-ROM"), a digital versatile disc ("DVD"), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency ("RF"), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

Although various arrow types and line types may be employed in the block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams, and combinations of blocks in the block diagrams, can be implemented by special purpose hardware-based systems that perform the specified functions or acts, or combinations of special purpose hardware and program code.

An apparatus with an alpha trim adjustment includes a phase delay circuit that creates a phase delay for a gate signal for a switching cycle. The gate signal is for a switch of a phase of a three-phase, phase shifted alternating current ("AC") input of a multi-pulse motor drive powering a direct current ("DC") motor. The apparatus includes an alpha trim circuit that modifies the phase delay with an alpha trim adjustment to create an adjusted phase delay for the switching cycle, a delay application circuit that applies the adjusted phase delay to the gate signal.

In some embodiments, the switching cycle is a first switching cycle and further comprising another switching cycle and, for each gate signal, the phase delay circuit includes a first delay circuit that includes the phase delay modified by a first alpha trim adjustment from the alpha trim circuit, and a second delay circuit that comprises the phase delay modified by a second alpha trim adjustment from the alpha trim circuit. The delay application circuit includes a setup switch that changes between a first position that connects the first delay circuit while disconnected from the second delay circuit and a second position that connects the second delay circuit while disconnected from the first delay circuit, and a setup switch controller that changes the setup switch between the first position and the second position during a non-switching period between switching cycles.

In other embodiments, the first delay circuit and the second delay circuit each include a plurality of clock-driven delay components arrangeable in series where each delay component provides a fixed amount of delay relative to a period of a clock signal and a number of delay components connected in series provides a delay of the period of the clock signal multiplied by the number of delay components connected in series. In other embodiments, the alpha trim circuit connects and disconnects delay components of the first and second delay circuits to a number of delay components in the first and second delay circuits connected in series to provide a phase delay. In other embodiments, the apparatus includes a frequency adjustment circuit that connects and disconnects delay components to maintain the phase delay in response to variations in a fundamental frequency of a power source providing power to the multi-pulse motor drive.

In some embodiments, the setup switch controller include a drive switch detection circuit that asserts a switch-on signal in response to detecting a switching cycle where the setup switch controller changes the setup switch between the first position and the second position during a period when the switch-on signal is not asserted. In other embodiments, the multi-pulse motor drive includes a 0-degree rectifier and a 30-degree rectifier. The 0-degree rectifier and the 30-degree rectifier each include a forward set of drive switches for driving the DC motor current in a forward direction and a negative set of drive switches for driving the DC motor current in a reverse direction and the switch-on signal is used by a lockout signal that turns off switching in the 0-degree rectifier and the 30-degree rectifier during a transition between forward and reverse driving of the DC motor.

In some embodiments, the alpha trim adjustment adds delay to or subtracts delay from the phase delay. In other embodiments, the alpha trim circuit adjusts the alpha trim adjustment in response to an amplitude difference between current from a 0-degree rectifier of the multi-pulse motor drive and current from a 30-degree rectifier of the multi-pulse motor drive. In other embodiments, the alpha trim circuit includes a comparator that compares current from a 0-degree rectifier of the multi-pulse motor drive and current from a 30-degree rectifier of the multi-pulse motor drive, an alpha pulse circuit increases the alpha trim adjustment in response to an output from the comparator indicative of the current from the 30-degree rectifier being higher than the current from the 0-degree rectifier; and decreases the alpha trim adjustment in response to an output from the comparator indicative of the current from the 30-degree rectifier being lower than the current from the 0-degree rectifier. In other embodiments, the apparatus includes an alpha pulse rate limiter that controls the alpha pulse circuit to limit a rate of increase and decrease of the alpha trim adjustment.

In other embodiments, the apparatus includes an average current circuit that measures current from two or more phases feeding a 0-degree rectifier of the multi-pulse motor drive and that measures current from two or more phases feeding a 30-degree rectifier of the multi-pulse motor drive and that averages the currents from the phases of feeding the 0-degree rectifier to provide a first input to the comparator and averages the currents from the phases feeding the 30-degree rectifier to provide a second input to the comparator. In other embodiments, the comparator provides a digital output to the alpha pulse circuit and the alpha pulse circuit provides an increase output with a digital pulse on an increase alpha trim line and provides a decrease output comprising a digital pulse on a decrease alpha trim line. In other embodiments, the alpha trim circuit includes an up/down counter that maintains a current alpha trim adjustment and increases the current alpha trim adjustment in response to a digital pulse on an increase alpha trim line and decreases the current alpha trim adjustment in response to a digital pulse on a decrease alpha trim line.

In some embodiments, the multi-pulse motor drive includes a phase delay circuit for each drive switch of a 30-degree rectifier of the multi-pulse motor drive. In other embodiments, the multi-pulse motor drive includes a 0-degree rectifier and a 30-degree rectifier. The 0-degree rectifier and the 30-degree rectifier each include a forward set of drive switches for driving the DC motor current in a forward direction and a negative set of drive switches for driving the DC motor current in a reverse direction where each drive switch of the 30-degree rectifier includes a phase delay circuit and the alpha trim circuit modifies the phase delay for each drive switch.

Another apparatus with an alpha trim adjustment includes a first delay circuit that delays a gate signal by 30 degrees plus a first alpha trim adjustment for a first switching cycle. The gate signal is for a phase of a three-phase, phase shifted AC input of a multi-pulse motor drive powering a DC motor. The apparatus includes a second delay circuit that delays the gate signal by 30 degrees plus a second alpha trim adjustment for another switching cycle and a setup switch that changes between a first position that connects the first delay circuit while disconnected from the second delay circuit and a second position that connects the second delay circuit while disconnected from the first delay circuit. The apparatus includes a setup switch controller that changes the setup switch between the first position and the second position during a non-switching period between switching cycles. The apparatus includes an average current circuit that measures current from two or more phases feeding a 0-degree rectifier of the multi-pulse motor drive and that measures current from two or more phases feeding a 30-degree rectifier of the multi-pulse motor drive and that averages the currents from the phases of feeding the 0-degree rectifier and averages the currents from the phases feeding the 30-degree rectifier. The apparatus includes an alpha trim circuit that adjusts the second alpha trim adjustment while the setup switch is in the first position and that sets the first alpha trim adjustment while the setup switch is in the second position in response to an amplitude difference between the average current from the 0-degree rectifier and the average current from the 30-degree rectifier.

In some embodiments, the first delay circuit and the second delay circuit each includes a plurality of clock-driven delay components arrangeable in series where each delay component provides a fixed amount of delay relative to a period of a clock signal and a number of delay components connected in series provides a delay of the period of the clock signal multiplied by the number of delay components connected in series, and where the alpha trim circuit connects and disconnects delay components of the first and second delay circuits to a number of delay components in the first and second delay circuits connected in series to provide a phase delay. In other embodiments, the setup switch controller includes a drive switch detection circuit that asserts a switch-on signal in response to detecting a switching cycle, where the setup switch controller changes the setup switch between the first position and the second position during a period when the switch-on signal is not asserted.

A multi-pulse motor controller with an alpha trim adjustment includes a 0-degree rectifier with a plurality of drive switches each driven by a gate signal. The 0-degree rectifier is fed by non-phase-shifted phases of a power source. The multi-pulse motor controller includes a 30-degree rectifier includes a plurality of drive switches each driven by a gate signal, the 30-degree rectifier fed by phase-shifted phases of a power source. Outputs of the 0-degree rectifier and the 30-degree rectifier feed a DC motor. Each drive switch of the 30-degree rectifier includes a first delay circuit that delays a gate signal by 30 degrees plus a first alpha trim adjustment for a first switching cycle, a second delay circuit that delays the gate signal by 30 degrees plus a second alpha trim adjustment for another switching cycle, and a setup switch that changes between a first position that connects the first delay circuit while disconnecting the second delay circuit and a second position that connects the second delay circuit while disconnecting the first delay circuit. The multi-pulse motor drive includes a setup switch controller that changes the setup switch of a drive switch between the first position and the second position during a non-switching period between switching cycles of the drive switch, and an alpha trim circuit that, for each drive switch, adjusts the second alpha trim adjustment while the setup switch of the drive switch is in the first position and that sets the first alpha trim adjustment while the setup switch for the drive switch is in the second position.

FIG. 1 is a schematic block diagram 100 of one embodiment of a 12-pulse motor drive powering a direct current ("DC") motor 102 and one embodiment of control circuits. It is typical for motor drives to be fed from a 3-phase alternating current ("AC") source 104. Typical 3-phase motor drives use a rectifier circuit, such as a full-bridge rectifier to convert 3-phase AC voltage to DC voltage useful for driving a DC motor, a non-motor load, such as an electro-plating operation, or for a DC bus, which may be used for conversion to an AC waveform with a variable frequency for driving an AC motor. A problem with 3-phase motor drives is that many topologies generate harmonics that waste power and require oversized equipment to handle the harmonic currents. In addition, harmonic currents drawn by 3-phase drives can cause problems for utilities providing the 3-phase power. A variety of methods are used to reduce harmonics, which often involve additional components, such as inductors, capacitors, etc. As motor sizes increase, component sizes increase, including components for mitigating harmonics.

Multi-pulse motor drives, such as a 12-pulse motor drive, offer a way to reduce harmonics. A typical 12-pulse motor drive includes a delta-delta-wye transformer 106 (e.g. "transformer 106") where the primary is delta-connected. The transformer 106 has two secondaries where one secondary is delta-connected and the other secondary is wye-connected, which has a 30-degree phase shift from the delta-connected secondary. The 12-pulse motor drive includes at least two rectifiers; a 0-degree rectifier 108 for the delta-connected secondary and a 30-degree rectifier 112 for the wye-connected secondary.

The 12-pulse motor drive may also include two 0-degree rectifiers 108, 110 for the delta-connected secondary, where a forward 0-degree rectifier 108 is for driving current of the DC motor 102 in a forward direction the other reverse 0-degree rectifier 110 is for driving current of the DC motor 102 in a reverse direction. For the wye-connected secondary, a forward 30-degree rectifier 112 is for driving current of the DC motor 102 in the forward direction and the other reverse 30-degree rectifier 114 is for driving current of the DC motor 102 in the reverse direction. Pulses generated by the 0-degree rectifiers 108, 110 are offset from pulses generated by the 30-degree rectifiers 112, 114, which increases efficiency and reduces harmonics and power losses.

In some embodiments, the 12-pulse motor drive includes an inductor circuit 116 that helps to reduce harmonics. Arrows in the inductor circuit 116 and in the line from the inductor circuit 116 to the DC motor 102 indicate current flow for a forward motor direction.

The 12-pulse motor drive includes a regulator 118 that determines if the DC motor 102 needs more power or less power to maintain a certain speed for a particular load, to increase speed, to decrease speed, to react to a load change, etc. The regulator 118 typically adjusts a turn-on time of switches F1-F6 of the rectifiers 108-114 to adjust a DC voltage level feeding the DC motor 102. In some embodiments, the regulator 118 is a PowerFlex® DC Stand-Alone Regulator by Allen-Bradley®. The switches F1-F6 may be of any known thyristor devices, such as an SCR, for example. The switches F1-F6 are typically switched with respect to a zero-crossing of a sinusoidal waveform of each phase feeding the rectifiers 108-114.

While a 12-pulse motor drive is depicted in FIG. 1, other multi-pulse motor drives may be used for embodiments described herein. For example, the multi-pulse motor drive may be 6-pulse motor drive, an 18-pulse motor drive, a 24-pulse motor drive, and the like. While a 12-pulse motor drive creates a set of 0-degree lines and a set of 30-degree delay lines, where drive signals are delayed 30 degrees for the 30-degree delay lines, other multi-pulse motor drives include other delays, such as 15 degrees, 20 degrees, 40 degrees, 45 degrees, etc. In other embodiments, the multi-pulse motor drive is used for series connected motor drives. For example, the series connected motor drives may be multi-pulse where rectifiers are connected in series. A multi-pulse series connected motor drive may include differing numbers of rectifiers with different phase delays, such as 15 degrees, 20 degrees, 40 degrees, 45 degrees, etc. Multi-pulse series connected motor drives typically need to balance control voltage instead of current so that output voltages of rectifier are used as an input signal instead of current from a current transformer 112. As used herein, a multi-pulse motor drive includes both series and parallel motor drives of various pulses.

A fundamental frequency of the AC source 104 is typically 50 hertz ("Hz") or 60 Hz, but other fundamental frequencies may be used. The regulator 118, in one example, may delay turn on of the switches F1-F6 for 35 degrees from the previous zero crossing of a sinusoidal waveform. The 35 degree delay, in one embodiment, may be called a firing angle. Where voltage to the DC motor 102 is to be increased, the regulator 118 may reduce the firing angle, for example to 30-degrees, so that power is connected through the rectifiers (e.g. 108, 112) to the DC motor 102 for a longer period than for the 35-degree firing angle. Alternatively, where voltage to the DC motor 102 is to be decreased, the regulator 118 may further delay switching so the firing angle is 40 degrees so that power is connected through the rectifiers (e.g. 108, 112) to the DC motor 102 for a shorter period of time. Note that other switching schemes and switches may also be used, such as symmetric voltage cancellation ("SVC") control, asymmetric voltage cancellation ("AVC") control, fixed conduction angle with variable voltage control, fixed conduction angle control, and the like. Any switching technique may be used that is compatible with a multi-pulse motor controller.

The regulator 118 typically provides gate signals to a gate drive circuit 120 for the 0-degree rectifiers 108, 110 and through a delay circuit 122 to a gate drive circuit 124 for the 30-degree rectifiers (e.g. 112, 114). In an alternate embodiment, the gate drive circuit 120 provides gate signals to the phase delay circuit 122. In a typical 12-pulse motor drive, the delay circuit 122 provides a 30-degree delay from the firing of the switches F1-F6 by the regulator 118. As used herein, a 0-degree signal fed to the 0-degree rectifiers 108, 110 is referenced from the firing angle. Likewise, a 30-degree signal fed to the 30-degree rectifiers 112, 114 is delayed from the firing angle by 30-degrees. Note that a 30-degree delay is dependent on the fundamental frequency of the AC source 104.

A 60 Hz fundamental frequency has a period of 16.67 microseconds ("mS") so that a 30-degree delay will be 1.39 mS. A 50 Hz fundamental frequency has a period of 20 mS so that a 30-degree delay will be 1.67 mS. While utilities routinely supply 60 Hz in some countries and 50 Hz in other countries, an actual fundamental frequency may vary from 50 Hz or 60 Hz. In addition, some power sources may have a greater variation of the fundamental frequency. In some embodiments, the phase delay circuit 122 includes a frequency sensing circuit to detect an actual fundamental frequency at the 12-pulse motor drive. The phase delay circuit 122 uses the measured frequency to determine the 30-degree delay that is to ensure that the time delay equates to 30 degrees of the fundamental frequency of the AC voltage source 104.

In addition to variations in fundamental frequency, voltage amplitude may vary between phases of the AC source 104. The transformer 106 is typically not perfect and the phase shift between the secondary windings may not be exactly 30 degrees. Transients, unequal phase loading, etc. may also cause variation between phase voltages and may cause variations to the phase shift between secondary windings of the transformer 106. The discrepancies in phase shift, phase imbalances, etc. may cause the 0-degree rectifiers 108, 110 to produce pulses with an amplitude different than the 30-degree rectifiers 112, 114, which causes unequal loading, unequal wear, increased harmonics, etc. To remedy discrepancies between rectifiers 108-114, an alpha trim circuit provides an adjustment to the 30-degree delay, which results in an ability to equalize pulses of the 0-degree rectifiers 108, 110 compared to the 30-degree rectifiers 112, 114. The alpha trim circuit is described below. While the 12-pulse motor drive of FIG. 1 includes 0-degree rectifiers 108, 110 and 30-degree rectifiers 112, 114, other motor drive topology may have more or less rectifiers.

Figure 2:
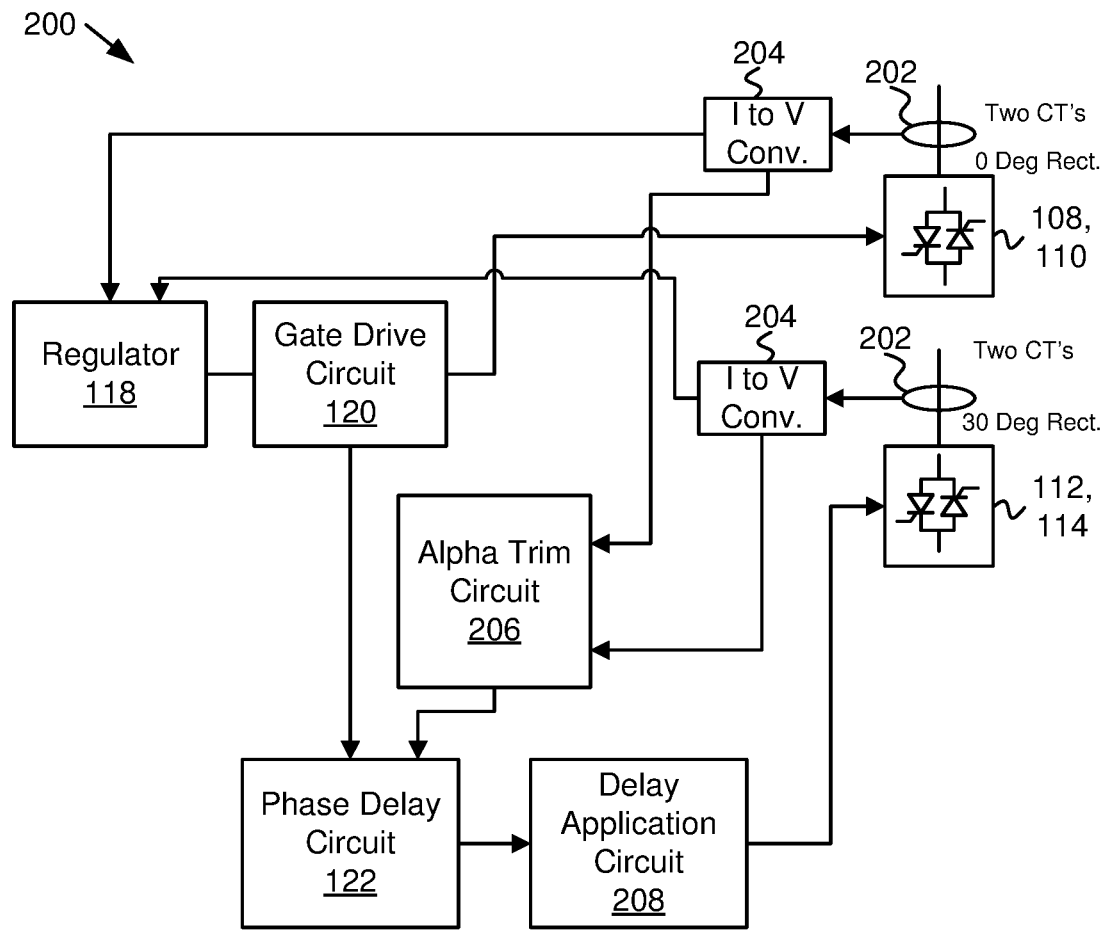
FIG. 2 is a schematic block diagram of one embodiment of controls for a multi-pulse motor drive with an alpha trim adjustment.

FIG. 2 is a schematic block diagram 200 of one embodiment of controls for a multi-pulse motor drive with an alpha trim adjustment. The depicted embodiment is for a 12-pulse motor drive. Other multi-pulse motor drives may also include an alpha trim adjustment. In the diagram 200, the 0-degree rectifiers 108, 110 and the 30-degree rectifiers 112, 114 are displayed in a simplified diagram. On a 12-pulse motor drive, typically current is measured and sent to the regulator 118. In the depicted embodiment, current transformers 202 measure current from two phases of the incoming power lines for the 0-degree rectifiers 108, 110 and the 30-degree rectifiers 112, 114 and are summed (not shown) and a signal is fed to a current to voltage converter 204 to derive a voltage signal for an alpha trim circuit 206. In other embodiments, three current transformers 202 are used where a current transformer 202 is used for each phase.

In the embodiment, the gate drive circuit 120 driving switches F1-F6 on the 0-degree rectifiers 108, 110 also sends a signal to a phase delay circuit 122 that creates a phase delay that is a 30-degree delay for a gate signal for a switching cycle of a 12-pulse motor drive. The switching cycle is a period where switches F1-F6 for the 30-degree rectifiers 112, 114 are commanded closed. The alpha trim circuit 206 modifies the 30-degree delay with an alpha trim adjustment to create an adjusted 30-degree delay for the switching cycle. For example, the alpha trim adjustment adds delay to or subtracts delay from the 30-degree delay. In one example, the alpha trim circuit 206 adds or subtracts up to 10 degrees from the 30-degree delay. In some instances, the alpha trim circuit 206 adjusts the alpha trim adjustment in response to an amplitude difference between current from the 0-degree rectifiers 108, 110 of the 12-pulse motor drive and current from the 30-degree rectifiers 112, 114 of the 12-pulse motor drive.

The alpha trim circuit 206 uses the voltage signals proportional to current from the rectifiers 108-114 to determine an amount of alpha trim adjustment. In some embodiments, the alpha trim circuit 206 compares the two current signals and produces a positive or negative alpha trim adjustment based in response to the comparison being positive or negative. For other multi-pulse motor drives, signals from additional rectifiers may be compared to signals from the 0-degree rectifiers 108, 110 or to another reference, such as an average current level. Beneficially, the alpha trim circuit 206 equalizes voltage/current pulses produced by the 0-degree rectifiers 108, 110 and the 30-degree rectifiers 112, 114 for equal power sharing between the rectifiers 108-114.

In the embodiment depicted in FIG. 2, the 12-pulse motor drive includes a delay application circuit 208 that applies the adjusted 30-degree delay to the gate signal of the 30-degree rectifiers 112, 114. The 30-degree delay modified by the alpha trim adjustment may be called a modified 30-degree delay. The modified 30-degree delay is referenced from the firing angle. In some embodiments, the 12-pulse motor drive includes a phase delay circuit 122 for each drive switch of a 30-degree rectifier of the 12-pulse motor drive and the alpha trim circuit 206 modifies the 30-degree delay for each drive switch F1-F6.

Figure 3:
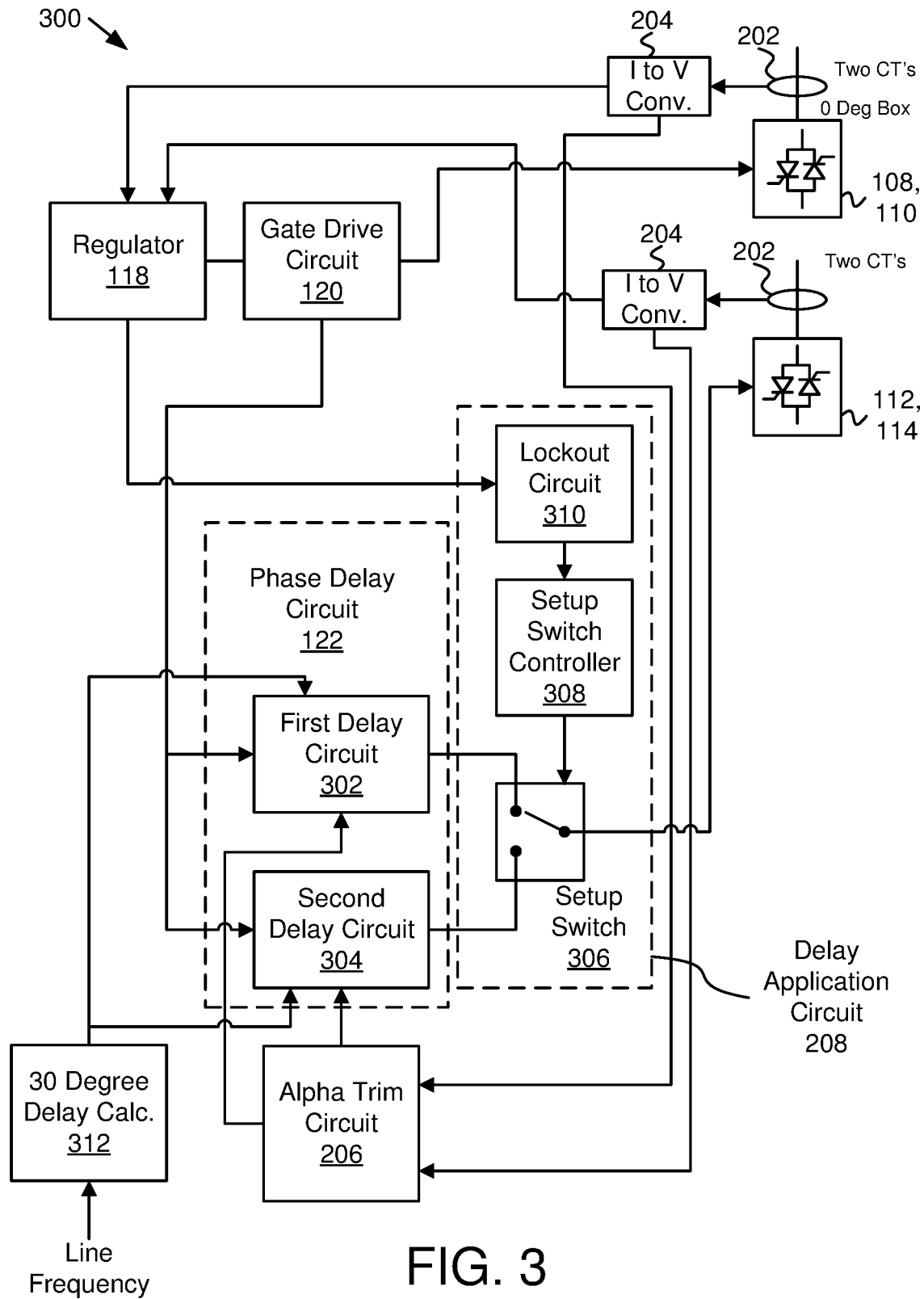
FIG. 3 is a schematic block diagram of another embodiment of controls for a multi-pulse motor drive with an alpha trim adjustment.

FIG. 3 is a schematic block diagram 300 of another embodiment of controls for a multi-pulse motor drive with an alpha trim adjustment. In the diagram 300, the rectifiers 108-114, current transformers 202, current to voltage converters 204, regulator 118 and gate drive circuit 120 are substantially similar to those described above.

In the embodiment depicted in FIG. 2, the phase delay circuit 122 includes a first delay circuit 302 and a second delay circuit 304. In the embodiment, the first delay circuit 302 includes the 30-degree delay modified by a first alpha trim adjustment from the alpha trim circuit 206 and the second delay circuit 304 includes the 30-degree delay modified by a second alpha trim adjustment from the alpha trim circuit 206. In the embodiment, the switching cycle is a first switching cycle and another switching cycle is different from the first switching cycle.

The delay application circuit 208 includes a setup switch 306 that changes between a first position that connects the first delay circuit 302 while disconnected from the second delay circuit 304 and a second position that connects the second delay circuit 304 while disconnected from the first delay circuit 302. In the embodiment, the delay application circuit 208 also includes a setup switch controller 308 that changes the setup switch 306 between the first position and the second position during a non-switching period between switching cycles. The delay application circuit 208 may also include other elements for driving switches of the 30-degree rectifiers 112, 114.

Having a first delay circuit 302 and a second delay circuit 304 allows the second delay circuit 304 to be setup while the first delay circuit 302 is active and vise-versa. A gate drive signal from the gate drive circuit 120 triggers execution of a first modified 30-degree delay of the first delay circuit 302, which is the 30-degree delay modified by the first alpha trim adjustment, when the setup switch 306 is in the first position. At the end of the first modified 30-degree delay, the drive switch connected to the first delay circuit 302 through the setup switch 306 in the first position turns, creating a first switching cycle, on based on a drive signal that propagates through the first delay circuit 302. While the first delay circuit 302 is active, the alpha trim circuit 206 adjusts the 30-degree delay of the second delay circuit 304. The setup switch controller 308 then changes the setup switch 306 from the first position to the second position during a non-switching period between switching cycles.

While the setup switch 306 is in the second position, the second delay circuit 304 is active and a gate drive signal from the gate drive circuit 120 triggers a second modified 30-degree delay, which is the 30-degree delay modified by the second alpha trim adjustment. At the end of the second modified 30-degree delay, the gate drive signal moves through the setup switch 306 in the second position and to a switch (e.g. F2) of the 30-degree rectifiers 112, 114 creating a second switching period. While the setup switch is in the second position, the alpha trim circuit 206 adjusts the 30-degree delay of the first delay circuit 302 using the first alpha trim adjustment in anticipation of the setup switch 306 moving again to the first position.

Note that the first alpha trim adjustment and the second alpha trim adjustment may be the same or may be different as the alpha trim circuit 206 may change an amount of alpha trim adjustment while one of the delay circuits 302, 304 is active. Also note that, in some embodiments, when the first delay circuit 302 is active the alpha trim circuit 206 does not adjust the first alpha trim adjustment and when the second delay circuit 304 is active the alpha trim circuit 206 does not adjust the second alpha trim adjustment.

In some embodiments, the multi-pulse motor drive includes a lockout circuit 310 that tracks switching cycles and locks out changing between forward rectifiers 108, 112 and reverse rectifiers 110, 114 for a period of time to avoid triggering switches F1-F6 of the rectifiers 108, 112 and reverse rectifiers 110, 114 at the same time. In some embodiments, the lockout circuit 310 includes edge detection circuitry for detecting when a switching cycle is starting and/or ending, which may be used by the setup switch controller 308 to determine a period of non-switching for changing the setup switch 306 between the first position and second position. In other embodiments, the setup switch controller 308 includes circuits independent of any lockout circuit 310 for determining a non-switching period.

In some embodiments, the 12-pulse motor drive includes a 30-degree delay calculation circuit 312 that uses a measurement of actual line frequency of power feeding the 12-pulse motor drive to calculate an amount of delay for the 30-degree delay. The 30-degree delay may then be fed into the first delay circuit 302 and second delay circuit 304. In some embodiments, the 30-degree delay calculation circuit 312 adjusts the 30-degree delay in response to a change in line frequency. In other embodiments, 30-degree delay calculation circuit 312 adjusts the 30-degree delay in the first delay circuit 302 when not active and in the second delay circuit 304 when not active.

Figure 4:
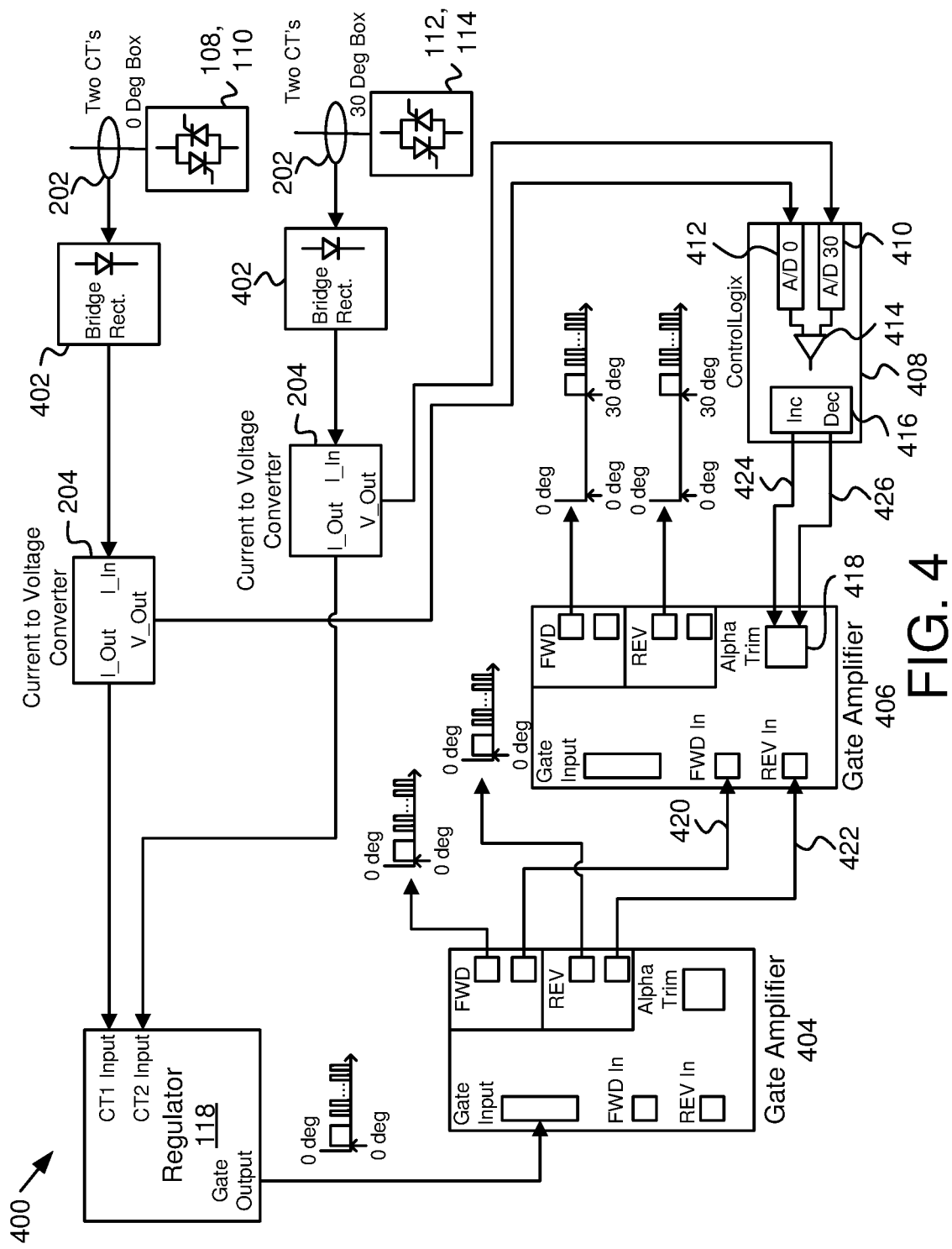
FIG. 4 is a schematic block diagram of a more detailed embodiment of controls for a multi-pulse motor drive with an alpha trim adjustment.

FIG. 4 is a schematic block diagram 400 of a more detailed embodiment of controls for a multi-pulse motor drive with an alpha trim adjustment. In the diagram 400, the rectifiers 108-114, current transformers 202, current to voltage converters 204, regulator 118 and gate drive circuit 120 are substantially similar to those described above. In addition, the diagram 400 also depicts a bridge rectifier 402 for the 0-degree rectifiers 108, 110 and the 30-degree rectifiers 112, 114, which averages the current signals from the current transformers 202. The bridge rectifiers 402, in one embodiment, are full bridge rectifiers that convert the current signals to a DC signal that represents current. The current to voltage converters 204 then send the current signals on to the regulator 118 but also create a signal where +/−1 ampere ("A") is represented by +/−10 volts ("V") for the alpha trim circuit 206. In other embodiments, the current to voltage converters 204 also send a +/−10 V signal to the regulator 118. In other embodiments, other circuit designs are used to derive a signal representative of current in the rectifiers 108-114.

In the diagram 400, the gate drive circuit 120 to drive the switches F1-F6 of the 0-degree rectifiers 108, 110 is represented by first gate amplifier 404, which includes a gate input, forward input ("FWD in"), reverse input ("REV in"), forward output ("FWD"), reverse output ("REV") and alpha trim. A similar second gate amplifier 406 to drive the switches F1-F6 of the 30-degree rectifiers 112, 114 includes the same inputs, outputs and alpha trim. The gate input receives a gate drive signal from the regulator 118, which includes a firing angle and the gate drive signal has a 0-degree reference that is correlated to the firing angle. The first gate amplifier 404 outputs two forward output signals. One forward output signal drives a switch (e.g. F1) in the forward 0-degree rectifier 108 and one forward output signal is sent to the forward input of the second gate amplifier 406 as a forward input signal 420. Likewise, the first gate amplifier 404 outputs two reverse output signals. One reverse output signal drives a switch (e.g. F1) in the reverse 0-degree rectifier 110 and one reverse output signal is sent to the reverse input of the second gate amplifier 406 as a reverse input signal 422. The alpha trim is not used for the first gate amplifier 404.

The alpha trim circuit 206 depicted in FIGS. 2 and 3 is represented by the ControlLogix® circuit 408 and the alpha trim 418 in FIG. 4. The ControlLogix circuit 408 is a control device made by Allen-Bradley®, but other embodiments include a different device. The ControlLogix circuit 408 includes two analog-to-digital converters 410, 412 that convert the signals from the current to voltage converters 204 of the 0-degree rectifiers 108, 110 and the 30-degree rectifiers 112, 114 to digital signals, which are fed to a comparator 414, which feeds an alpha pulse circuit 416. The alpha pulse circuit 416 has an increase output ("INC") and a decrease output ("DEC") connected to the alpha trim 418 of the second gate amplifier 406.

When the signal from the 30-degree rectifiers 112, 114 compared to the signal from the 0-degree rectifiers 108, 110 calls for an increase in the alpha trim adjustment, the alpha pulse circuit 416 sends out pulses on the increase alpha trim line 424 at a prescribed rate. In one embodiment, the ControLogix circuit 408 includes an alpha pulse rate limiter (not shown) that controls the alpha pulse circuit to limit a rate of increase and decrease of the alpha trim adjustment. Each pulse, in some embodiments, increases the alpha trim adjustment by a certain amount. For example, each pulse from the increase alpha trim line 424 may increase the alpha trim adjustment by 0.1 degrees.

Other embodiments include a different increment for the increase alpha trim line 424. Likewise, when the signal from the 30-degree rectifiers 112, 114 compared to the signal from the 0-degree rectifiers 108, 110 calls for a decrease in the alpha trim adjustment, the alpha pulse circuit 416 sends out pulses on the decrease alpha trim line 426 at a prescribed rate dictated by the alpha pulse rate limiter. Other embodiments include an analog comparator feeding the alpha trim 418, which includes analog-to-digital circuits and/or other circuits to change the alpha trim adjustment.

Each pulse, in some embodiments, decreases the alpha trim adjustment by a certain amount. For example, each pulse from the decrease alpha trim line 426 may decrease the alpha trim adjustment by 0.1 degrees. Other embodiments include a different increment for the increase alpha trim line 424 and the decrease alpha trim line 426. In addition, the alpha pulse rate limiter controls the rate of pulses on the increase alpha trim line 424 and the decrease alpha trim line 426, depending on a desired rate of increase/decrease for the alpha trim adjustment.

The second gate amplifier 406 adjusts the forward input signal 420 and the reverse input signal 422, which result in a modified forward output and a modified reverse output from the second gate amplifier 406 to the 30-degree rectifiers 112, 114. The 30-degree delay, in some embodiments, is calculated in the second gate amplifier 406, which receives a line frequency signal (not shown) to calculate the 30-degree delay. The alpha trim adjustment modifies the 30-degree delay and a modified 30-degree delay is added to the forward input signal 420 and the reverse input signal 422. Where the phase delay differs from 30 degrees, for example, 15 degrees, 20 degrees, 40 degrees, 45 degrees, etc., the second gate amplifier 406 includes a switch, a dial, or other mechanism to set the base phase delay and the second gate amplifier 406 calculates the phase delay based on the setting for the phase delay.

Figure 5:
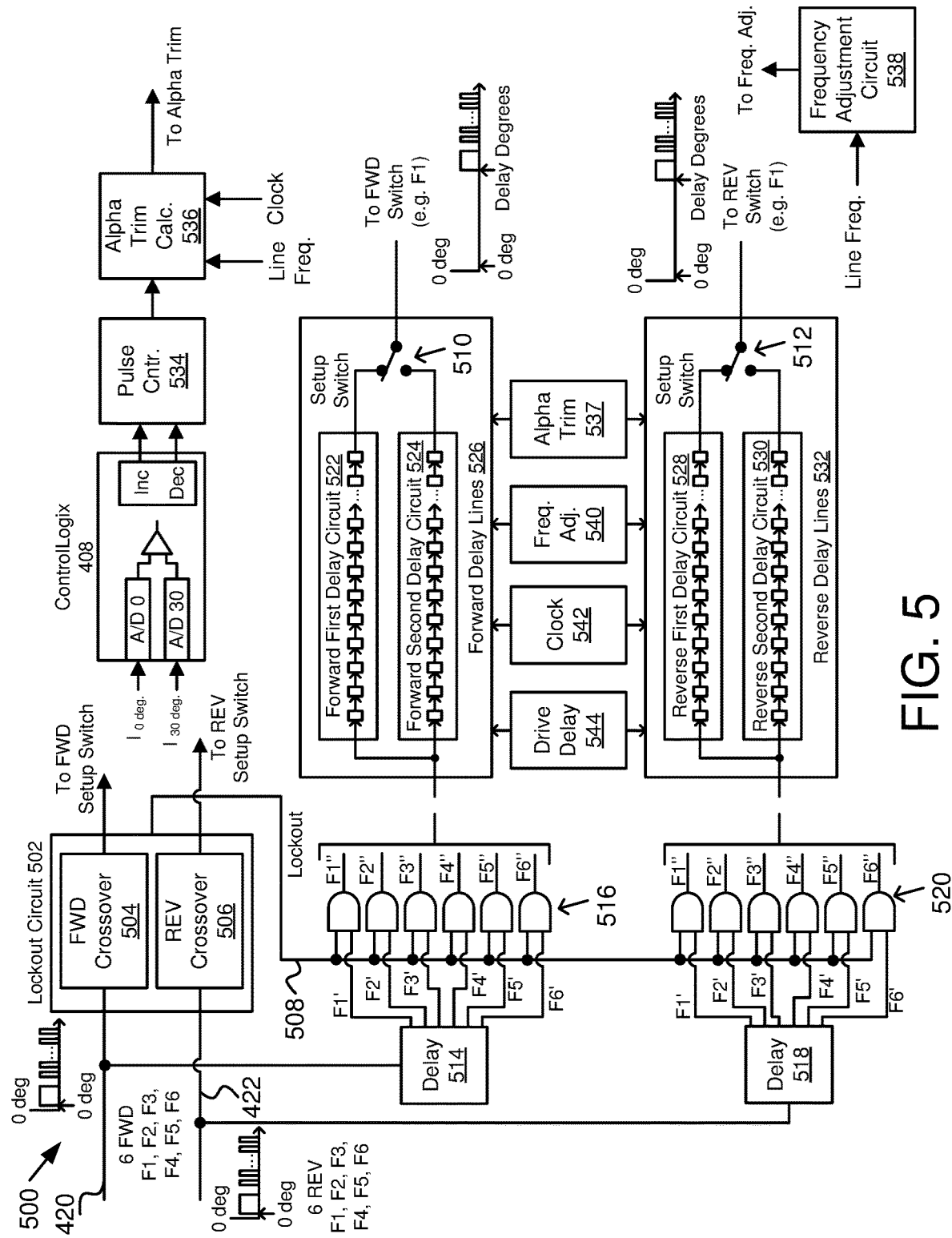
FIG. 5 is a schematic block diagram of an embodiment of a portion of controls for a multi-pulse motor drive with an alpha trim adjustment.

FIG. 5 is a schematic block diagram 500 of an embodiment of a portion of controls for a multi-pulse motor drive with an alpha trim adjustment. The ControlLogix circuit 408 of FIG. 4 is depicted along with internal components of the alpha trim 418 of the second gate amplifier 406 of FIG. 4. The forward input signal 420 and the reverse input signal 422 are fed to a lockout circuit 502, which includes a forward crossover circuit 504 and a reverse crossover circuit 506. The lockout circuit 502, in one embodiment, produces a lockout signal 508 that prevents gate drive signals being sent to the 0-degree rectifiers 108, 110 and to the 30-degree rectifiers 112, 114 as depicted in FIG. 5, or for other rectifiers for multi-pulse motor drives with a different number of pulses. In some embodiments, the forward crossover circuit 504 includes circuitry to detect a start and/or a finish of a series of gate drive signal pulses making up a switching period, which are used by the setup switches 510, 512 to determine a non-switching period. Other embodiments include other circuits different than from the lockout circuit 502 to determine a non-switching period.

The forward input signal 420, in some embodiments, are 6 forward signals for switches F1-F6 of the forward 30-degree rectifier 112. The forward input signals 420, depicted as a single line, are fed to a delay 514, which is a small delay intended to allow the forward crossover circuit 504 to operate. In other embodiments, other means are used to allow the forward crossover circuit 504 to operate. The delay 514 is depicted as one device but may be multiple devices with one device per drive signal. The output of the delay 514 is fed to AND gates 516, which are combined with the lockout signal 508 to control lockout of the forward 30-degree rectifier 112. Likewise, the reverse input signal 422, in some embodiments, are 6 reverse signals for switches F1-F6 of the reverse 30-degree rectifier 114. The reverse input signals 422, depicted as a single line, are fed to a delay 518, which is a small delay intended to allow the reverse crossover circuit 506 to operate. In other embodiments, other means are used to allow the reverse crossover circuit 506 to operate. The delay 518 is depicted as one device but may be multiple devices with one device per drive signal. The output of the delay 518 is fed to AND gates 520, which are combined with the lockout signal 508 to control lockout of the reverse 30-degree rectifier 114.

In the depicted embodiment of FIG. 5, there is a forward first delay circuit 522 and a forward second delay circuit 524 for the forward delay lines 526 that delay a gate drive signal to the forward 30-degree rectifier 112. There is also a reverse first delay circuit 528 and a reverse second delay circuit 530 for the reverse delay lines 532 that delay a gate drive signal to the reverse 30-degree rectifier 114. The forward first delay circuit 522 and the reverse first delay circuit 528 are one embodiment of the first delay circuit 302 of the diagram 300 of FIG. 3 and the forward second delay circuit 524 and the reverse second delay circuit 530 are one embodiment of the second delay circuit 304 of the diagram 300 of FIG. 3.

In the depicted embodiment, the first delay circuits 522, 528 and the second delay circuits 524, 530 each include a plurality of clock-driven delay components arrangeable in series. Each delay component provides a fixed amount of delay relative to a period of a clock signal and a number of delay components connected in series provides a delay of the period of the clock signal multiplied by the number of delay components connected in series. For example, the delay components may be D flip-flops. In another embodiment, the delay element includes NAND gates arranged to output what is on an input line after a clock signal. One of skill in the art will recognize other ways to construct a memory element where an input signal is clocked to an output after application of a clock signal. For example, an adjustable counter may function to provide a delay.

The ControlLogix circuit 408 is connected to a pulse counter 534, which may be an up/down counter, maintains a current alpha trim adjustment and increases the current alpha trim adjustment in response to a digital pulse on the increase alpha trim line 424 and decreases the current alpha trim adjustment in response to a digital pulse on the decrease alpha trim line 426. An output of the pulse counter 534, in some embodiments, is connected to an input of an alpha trim calculation circuit 536 that calculates a number of delay elements corresponding to a current alpha trim adjustment, which may vary based on a current line frequency and a clock period. The alpha trim calculation circuit 536 adjusts the number of required delay elements based on a line frequency measurement and a period of the clock. The alpha trim calculation circuit 536 is depicted feeding an alpha trim 537, which feeds an alpha trim adjustment to the forward delay lines 526 and reverse delay lines 532. The alpha trim 537 is depicted for convenience, but one of skill in the art understands that the alpha trim calculation circuit 536 may feed the forward delay lines 526 and reverse delay lines 532 directly.

A frequency adjustment circuit 538 receives a measurement of a current line frequency and determines a number of delay elements for the 30-degree delay and feeds the number of delay elements for the 30-degree delay to a frequency adjustment 540 feeding the forward delay lines 526 and reverse delay lines 532. The frequency adjustment 540 is depicted for convenience and one of skill in the art will recognize that other embodiments may include a frequency adjustment circuit 538 that feeds the number of delay elements for the 30-degree delay directly to forward delay lines 526 and reverse delay lines 532. A clock 542 also feeds the forward delay lines 526 and reverse delay lines 532 as well as the alpha trim calculation circuit 536.

A drive delay circuit 544 is included in some embodiments and feeds the forward delay lines 526 and reverse delay lines 532 and sets an amount of delay based on topology of the motor drive. In some embodiments, the drive delay circuit 544 includes a mode switch that sets an amount of phase delay. Where the motor drive is a 12-pulse motor drive, the drive delay circuit 544 sets the delay to 30 degrees. Other motor drives may require a different delay. For example, a 24-pulse motor drive may require a 15-degree delay, 30-degree delay and a 45-degree delay, an 18-pulse motor drive may require a 20-degree delay and a 40-degree delay, etc. where a gate amplifier 404, 406 is used for each rectifier section. For the embodiments described herein, the drive delay circuit 544 is set to 30 degrees.

In one embodiment, the line frequency is 60 Hz, which has a period of 16.667 mS, which represents 360 degrees, or 46.296 microseconds ("µS") per degree. If the alpha trim adjustment can be +/−10 degrees added to a 30-degree delay, the range of the alpha trim adjustment plus the 30-degree delay is 40 degrees to 20 degrees. A range of delays would be the 30-degree delay would be 1.3889 mS+/−462.96 µS. A longest delay would be 1.3889 mS+462.96 µS=1.8519 mS. If the clock is a 4 mega Hertz ("MHz") clock, the period is 0.25 µS so that 1.8519 mS/0.25 µS=7407 delay elements. Where there are 12 active lines (6 forward, 6 reverse) in the forward first delay circuits 522 and reverse first delay circuits 528 and 12 setup lines (6 forward, 6, reverse) in the forward second delay circuits 524 and reverse second delay circuits 530, there are 24 total delay circuits 522, 524, 528, 530, so at 60 Hz with a 4 MHz clock and at an alpha trim of +10 degrees, a total of 177,778 delay elements would be required. This results in 185.19 counts per degree of resolution.

A worst case scenario, in terms of largest number of delay elements, could be calculated from the minimum acceptable frequency and highest alpha trim adjustment. For example, where a power source fundamental frequency is 50 Hz+/−10 Hz, a minimum frequency is 40 Hz, with a period of 25 mS, or 69.444 µS per degree. For a 45-degree delay and an alpha trim adjustment of +/−10 degrees, a +10 degree alpha trim adjustment would result in a delay of 55 degrees, or 3.819 mS. Again, using a 4 MHz clock, this results in 15,278 delay elements for 24 lines or 366,667 delay elements. This results in 277.78 counts per degree of resolution. Thus, where an alpha trim 418 of a second gate amplifier 406 has an FPGA or similar device with a particular number of delay device, the extremes of possible line frequencies, a clock rate, and a desired per degree minimum resolution can be used to select an FPGA and clock frequency to meet desired requirements.

While the delay circuits 522, 524, 528, 530 are depicted with discrete delay elements, other logic, circuits, etc. may be used to create a 30-degree delay adjusted by an alpha trim adjustment. One of skill in the art will recognize other ways to create a gate drive signal delay based on a 30-degree delay and an alpha trim adjustment.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
    a phase delay circuit that creates a phase delay for a gate signal for a switching cycle, the gate signal for a switch of a phase of a three-phase, phase shifted alternating current ("AC") input of a multi-pulse motor drive powering a direct current ("DC") motor, the multi-pulse motor drive comprising an un-delayed rectifier and one or more phase delayed rectifiers and the gate signal is applied to a switch of the one or more phase delayed rectifiers, wherein the phase delay is based on a fundamental frequency of a power source feeding the multi-pulse motor drive;
    an alpha trim circuit that modifies the phase delay with an alpha trim adjustment to create an adjusted phase delay for the switching cycle, wherein the alpha trim adjustment adds delay to or subtracts delay from the phase delay and wherein the alpha trim adjustment is based on current and/or voltage differences between one or more switches of the un-delayed rectifier and one or more switches of a phase delayed rectifier of the one or more phase delayed rectifiers; and
    a delay application circuit that applies the adjusted phase delay to the gate signal.

2. The apparatus of claim 1, wherein the switching cycle is a first switching cycle and further comprising another switching cycle and, for each gate signal:
    the phase delay circuit comprises:
        a first delay circuit that comprises the phase delay modified by a first alpha trim adjustment from the alpha trim circuit; and a second delay circuit that comprises the phase delay modified by a second alpha trim adjustment from the alpha trim circuit; and the delay application circuit comprises:
- a setup switch that changes between a first position that connects the first delay circuit while disconnected from the second delay circuit and a second position that connects the second delay circuit while disconnected from the first delay circuit; and
- a setup switch controller that changes the setup switch between the first position and the second position during a non-switching period between switching cycles.

3. The apparatus of claim 1, wherein the alpha trim circuit adjusts the alpha trim adjustment in response to an amplitude difference between current from a 0-degree rectifier of the multi-pulse motor drive and current from a 30-degree rectifier of the multi-pulse motor drive.

4. The apparatus of claim 1, wherein the alpha trim circuit comprises:
- a comparator that compares current from a 0-degree rectifier of the multi-pulse motor drive and current from a 30-degree rectifier of the multi-pulse motor drive;
- an alpha pulse circuit that:
  - increases the alpha trim adjustment in response to an output from the comparator indicative of the current from the 30-degree rectifier being higher than the current from the 0-degree rectifier; and
  - decreases the alpha trim adjustment in response to an output from the comparator indicative of the current from the 30-degree rectifier being lower than the current from the 0-degree rectifier.

5. The apparatus of claim 1, wherein the multi-pulse motor drive comprises a phase delay circuit for each drive switch of a 30-degree rectifier of the multi-pulse motor drive.

6. The apparatus of claim 1, wherein the multi-pulse motor drive comprises a 0-degree rectifier and a 30-degree rectifier, the 0-degree rectifier and the 30-degree rectifier each comprise a forward set of drive switches for driving the DC motor current in a forward direction and a negative set of drive switches for driving the DC motor current in a reverse direction, wherein each drive switch of the 30-degree rectifier comprises a phase delay circuit and wherein the alpha trim circuit modifies the phase delay for each drive switch.

7. The apparatus of claim 2, wherein the first delay circuit and the second delay circuit each comprise a plurality of clock-driven delay components arrangeable in series, wherein each delay component provides a fixed amount of delay relative to a period of a clock signal and a number of delay components connected in series provides a delay of the period of the clock signal multiplied by the number of delay components connected in series.

8. The apparatus of claim 2, wherein the setup switch controller further comprises a drive switch detection circuit that asserts a switch-on signal in response to detecting a switching cycle, wherein the setup switch controller changes the setup switch between the first position and the second position during a period when the switch-on signal is not asserted.

9. The apparatus of claim 4, further comprising an alpha pulse rate limiter that controls the alpha pulse circuit to limit a rate of increase and decrease of the alpha trim adjustment.

10. The apparatus of claim 4, further comprising an average current circuit that measures current from two or more phases feeding a 0-degree rectifier of the multi-pulse motor drive and that measures current from two or more phases feeding a 30-degree rectifier of the multi-pulse motor drive and that averages the currents from the phases of feeding the 0-degree rectifier to provide a first input to the comparator and averages the currents from the phases feeding the 30-degree rectifier to provide a second input to the comparator.

11. The apparatus of claim 4, wherein the comparator provides a digital output to the alpha pulse circuit and the alpha pulse circuit provides an increase output comprising a digital pulse on an increase alpha trim line and provides a decrease output comprising a digital pulse on a decrease alpha trim line.

12. The apparatus of claim 4, wherein the alpha trim circuit comprises an up/down counter that maintains a current alpha trim adjustment and increases the current alpha trim adjustment in response to a digital pulse on an increase alpha trim line and decreases the current alpha trim adjustment in response to a digital pulse on a decrease alpha trim line.

13. The apparatus of claim 7, wherein the alpha trim circuit connects and disconnects delay components of the first and second delay circuits to a number of delay components in the first and second delay circuits connected in series to provide a phase delay.

14. The apparatus of claim 8, wherein the multi-pulse motor drive comprises a 0-degree rectifier and a 30-degree rectifier, the 0-degree rectifier and the 30-degree rectifier each comprise a forward set of drive switches for driving the DC motor current in a forward direction and a negative set of drive switches for driving the DC motor current in a reverse direction and wherein the switch-on signal is used by a lockout signal that turns off switching in the 0-degree rectifier and the 30-degree rectifier during a transition between forward and reverse driving of the DC motor.

15. The apparatus of claim 13, further comprising a frequency adjustment circuit that connects and disconnects delay components to maintain the phase delay in response to variations in the fundamental frequency of a power source providing power to the multi-pulse motor drive.

16. An apparatus comprising:
- a first delay circuit that delays a gate signal by 30 degrees plus a first alpha trim adjustment for a first switching cycle, the gate signal for a phase of a three-phase, phase shifted alternating current ("AC") input of a multi-pulse motor drive powering a direct current ("DC") motor;
- a second delay circuit that delays the gate signal by 30 degrees plus a second alpha trim adjustment for another switching cycle, wherein the alpha trim adjustment adds delay to or subtracts delay from the 30 degree gate signal delay;
- a setup switch that changes between a first position that connects the first delay circuit while disconnected from the second delay circuit and a second position that connects the second delay circuit while disconnected from the first delay circuit;
- a setup switch controller that changes the setup switch between the first position and the second position during a non-switching period between switching cycles;
- an average current circuit that measures current from two or more phases feeding a 0-degree rectifier of the multi-pulse motor drive and that measures current from two or more phases feeding a 30-degree rectifier of the multi-pulse motor drive and that averages the currents from the phases of feeding the 0-degree rectifier and averages the currents from the phases feeding the 30-degree rectifier; and an alpha trim circuit that adjusts the second alpha trim adjustment while the setup switch is in the first position and that sets the first alpha trim adjustment while the setup switch is in the second position in response to an amplitude difference between the average current from the 0-degree rectifier and the average current from the 30-degree rectifier.

17. The apparatus of claim 16, wherein the first delay circuit and the second delay circuit each comprise a plurality of clock-driven delay components arrangeable in series, wherein each delay component provides a fixed amount of delay relative to a period of a clock signal and a number of delay components connected in series provides a delay of the period of the clock signal multiplied by the number of delay components connected in series, and wherein the alpha trim circuit connects and disconnects delay components of the first and second delay circuits to a number of delay components in the first and second delay circuits connected in series to provide a phase delay.

18. The apparatus of claim 16, wherein the setup switch controller further comprises a drive switch detection circuit that asserts a switch-on signal in response to detecting a switching cycle, wherein the setup switch controller changes the setup switch between the first position and the second position during a period when the switch-on signal is not asserted.

19. A multi-pulse motor controller comprising:
a 0-degree rectifier comprising a plurality of drive switches each driven by a gate signal, the 0-degree rectifier fed by non-phase-shifted phases of a power source;
a 30-degree rectifier comprising a plurality of drive switches each driven by a gate signal, the 30-degree rectifier fed by phase-shifted phases of a power source,
wherein outputs of the 0-degree rectifier and the 30-degree rectifier feed a direct current ("DC") motor,
wherein each drive switch of the 30-degree rectifier comprises:
a first delay circuit that delays a gate signal by 30 degrees plus a first alpha trim adjustment for a first switching cycle, wherein the first alpha trim adjustment adds delay to or subtracts delay from the 30 degree gate signal delay;
a second delay circuit that delays the gate signal by 30 degrees plus a second alpha trim adjustment for another switching cycle, wherein the second alpha trim adjustment adds delay to or subtracts delay from the 30 degree gate signal delay; and
a setup switch that changes between a first position that connects the first delay circuit while disconnecting the second delay circuit and a second position that connects the second delay circuit while disconnecting the first delay circuit;
a setup switch controller that changes the setup switch of a drive switch between the first position and the second position during a non-switching period between switching cycles of the drive switch; and
an alpha trim circuit that, for each drive switch, adjusts the second alpha trim adjustment while the setup switch of the drive switch is in the first position and that sets the first alpha trim adjustment while the setup switch for the drive switch is in the second position.

* * * * *